United States Patent [19]

Takizawa et al.

[11] Patent Number: 5,655,629

[45] Date of Patent: Aug. 12, 1997

[54] BICYCLE BRAKE SHOE

[75] Inventors: Shinichi Takizawa; Katsuyuki Ohta, both of Sakai, Japan

[73] Assignee: Shimano Inc., Osaka, Japan

[21] Appl. No.: 592,409

[22] PCT Filed: May 24, 1995

[86] PCT No.: PCT/JP95/00998

§ 371 Date: Jan. 22, 1996

§ 102(e) Date: Jan. 22, 1996

[87] PCT Pub. No.: WO95/32119

PCT Pub. Date: Nov. 30, 1995

[30] Foreign Application Priority Data

May 25, 1994 [JP] Japan .................... 6/111303

[51] Int. Cl.$^6$ .................... B62L 1/02; F16D 65/00
[52] U.S. Cl. .................... 188/24.12; 188/73.1
[58] Field of Search .................... 188/24.11, 24.22, 188/73.1, 250 B

[56] References Cited

U.S. PATENT DOCUMENTS

| | | | |
|---|---|---|---|
| 4,444,294 | 4/1984 | Yoshigai | 188/24.11 |
| 5,277,277 | 1/1994 | Yoshigai | 188/24.19 |

FOREIGN PATENT DOCUMENTS

| | | |
|---|---|---|
| 62-170393 | 10/1987 | Japan . |
| 3056471 | 12/1991 | Japan . |

*Primary Examiner*—Robert J. Oberleitner
*Assistant Examiner*—Chris Schwartz
*Attorney, Agent, or Firm*—Shinjyu Office of Patent Attorneys

[57] ABSTRACT

Brake shoes 13a and 13b are embedded-types to be attached to brake arms 12a and 12b of a brake device 1 which acts upon both sides 5a of a rim 5 and include fixing pins E and shoe main bodies D, wherein the fixing pins E are made of aluminum and can be connected to the brake arms 12a and 12b, and the shoe main bodies D have holder plates 16 fixed on tips of the fixing pins E; elastomer-made friction pads 17 in which the holder plates 16 are embedded and which come into contact with the rim 5 and thereby act upon it; and a mass of 28.0 g or larger, wherein the holder plates 16 have a larger mass than the friction pads 17, and the shoe main bodies D have a mass at least 10 times that of the fixing pins E.

9 Claims, 5 Drawing Sheets

BICYCLE BRAKE SHOE

TECHNICAL FIELD

The present invention relates to a bicycle brake shoe, particularly, an embedded type which is to be attached to a brake arm of a brake device which acts upon a bicycle wheel rim.

BACKGROUND ART

A bicycle capable of running off-road, which is, for example, called a mountain bike or all-terrain bike (ATB), is generally equipped with a cantilever type brake device for obtaining a strong deceleration force. The cantilever type brake device comes into contact with both sides of a bicycle wheel rim and thereby acts upon them, and is equipped with a pair of brake arms and a pair of brake shoes. An end of each brake arm is freely pivotally supported by a front fork or a seat stay, and the other end is hung on a brake wire. In addition, the brake shoes are oppositely placed along both sides of the bicycle wheel rim in the middle of the brake arm. Of the brake shoes, an embedded type has: a fixing pin which can be connected to the brake arm; and a shoe main body which is fixed on the fixing pin. The shoe main body includes a mainly synthetic resin-made friction pad, in which a holder plate that is fixed on a tip of the fixing pin is embedded.

In such a cantilever type bicycle brake device, the brake arms are allowed to pivot in the closing directions by pulling brake wires with a brake lever, so that the brake shoes are brought into contact with the rim to press it, thus achieving deceleration.

In such a bicycle brake device, in the case where the wheel rim gets wet because of running under rainy weather or under wet conditions such as on mud roads, noises may be made when the brake shoes are in contact with the wheel rim to press it during deceleration. The noises can roughly be divided into high sound components having a generally high frequency and low sound components which sound having a generally low frequency, and they all grate upon riders' ears. Accordingly, bicycle brake devices are necessary which suppress noises even if the wheel rim gets wet.

An object of the present invention is to suppress noises during deceleration.

DISCLOSURE OF THE INVENTION

A bicycle brake shoe, according to a first embodiment of the present invention, is an embedded type brake shoe to be attached to a brake arm of a brake device which acts upon a bicycle wheel rim, the bicycle brake shoe including a fixing pin and a Shoe main body wherein the fixing pin is made of aluminum and can be connected to the brake arm, and the shoe main body has: a holder plate fixed on a tip of the fixing pin; an elastomer-made friction pad in which the holder plate is embedded and which comes into contact with the wheel rim and thereby acts upon the wheel rim; and the shoe main body having a mass of 28:0 g or larger.

As to this bicycle brake shoe, when the brake arm pivots, the brake shoe connected to the brake arm comes into contact with the wheel rim to press it, thereby effecting deceleration. On this occasion, in the case where the mass of the shoe main body is less than 28.0 g, the use of the aluminum-made fixing pin is liable to cause loud noises. However, it is difficult for noises to occur in the first embodiment of the present invention, because the mass of the shoe main body is 28.0 g or larger.

A bicycle brake shoe, according to a second embodiment of the present invention, has the same features as the first embodiment, but in the second embodiment the holder plate has a larger mass than the friction pad. Therefore, also in the second embodiment, it is difficult for noises to occur.

A bicycle brake shoe, according to a third embodiment of the present invention, has the same features as the first or second embodiment, but in the third embodiment the mass ratio of the shoe main body to the fixing pin is 10 or larger. Therefore, in the third embodiment, it is difficult for noises to occur.

A bicycle brake shoe, according to a fourth embodiment of the present invention, is an embedded type brake shoe to be attached to a brake arm of a brake device which acts upon a bicycle wheel rim, the bicycle brake shoe including a fixing pin and a shoe main body, wherein the fixing pin can be connected to the brake arm, and the shoe main body has: a holder plate fixed on a tip of the fixing pin; an elastomer-made friction pad in which the holder plate is embedded and which comes into contact with the wheel rim and thereby acts upon the wheel rim; and a mass at least 10 times that of the fixing pin. Therefore, also in the fourth embodiment, it is difficult for noises to occur.

A bicycle brake shoe, according to a fifth embodiment of the present invention, is an embedded type brake shoe to be attached to a brake arm of a brake device which acts upon a bicycle wheel rim, the bicycle brake shoe including a fixing pin and a shoe main body, wherein the fixing pin is made of iron and can be connected to the brake arm, and the shoe main body has: a holder plate fixed on a tip of the fixing pin; an elastomer-made friction pad in which the holder plate is embedded and which comes into contact with the wheel rim and thereby acts upon the wheel rim; and the shoe main body having a mass at least 4 times that of the fixing pin. Therefore, also in the fifth embodiment, it is difficult for noises to occur.

BEST MODE FOR CARRYING OUT THE INVENTION

Figure 1:
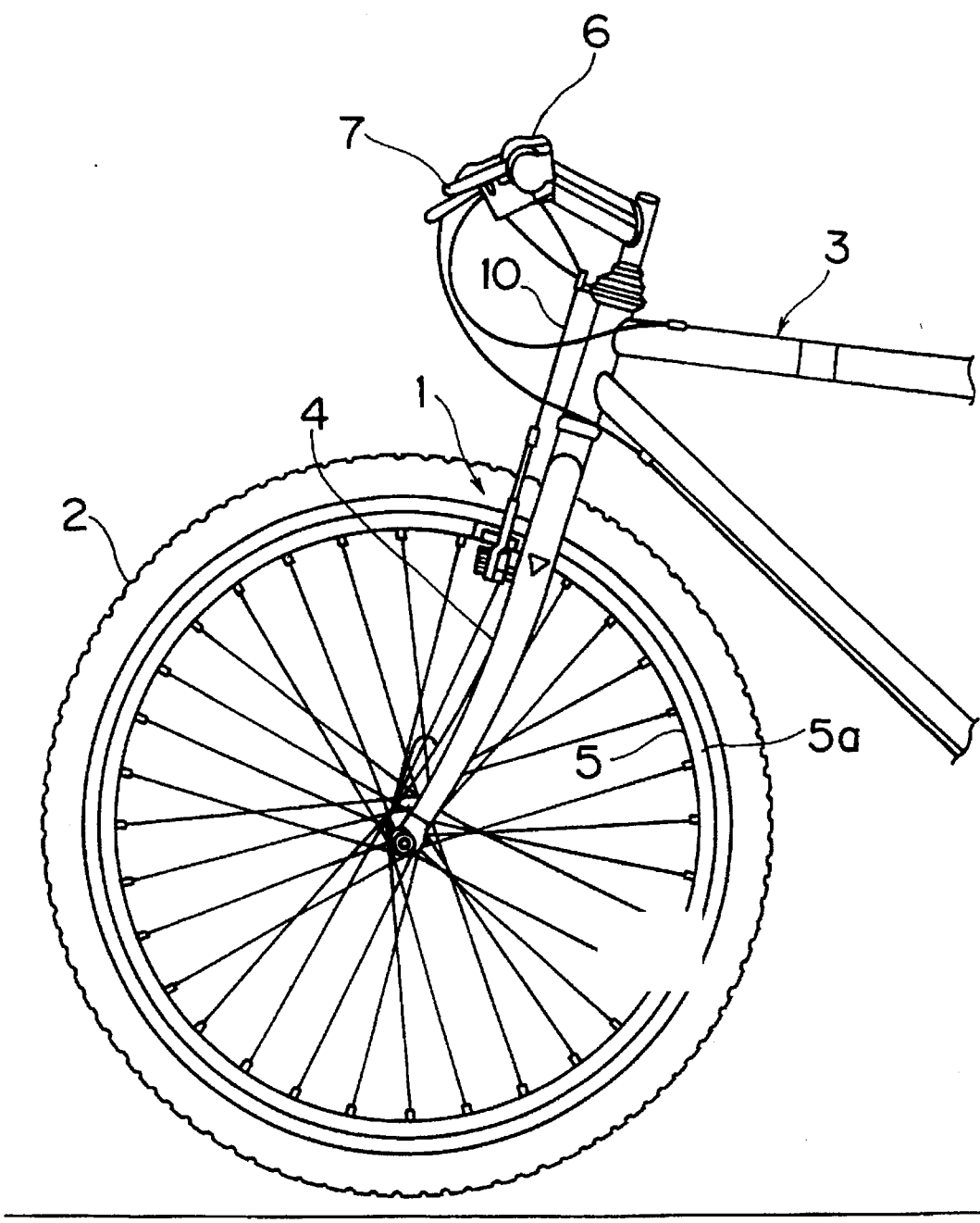
FIG. 1 is a side view of a front part of a bicycle to which an embodiment of the present invention is applied.

In FIG. 1, a cantilever type brake device 1 to which an embodiment of the present invention is applied is, for example, used for a front wheel and freely pivotally supported in the middle of a front fork 4 of a frame 3. The brake device 1 comes into contact with and presses both sides 5a of a rim 5 of a front wheel 2, thereby effecting deceleration.

Figure 2:
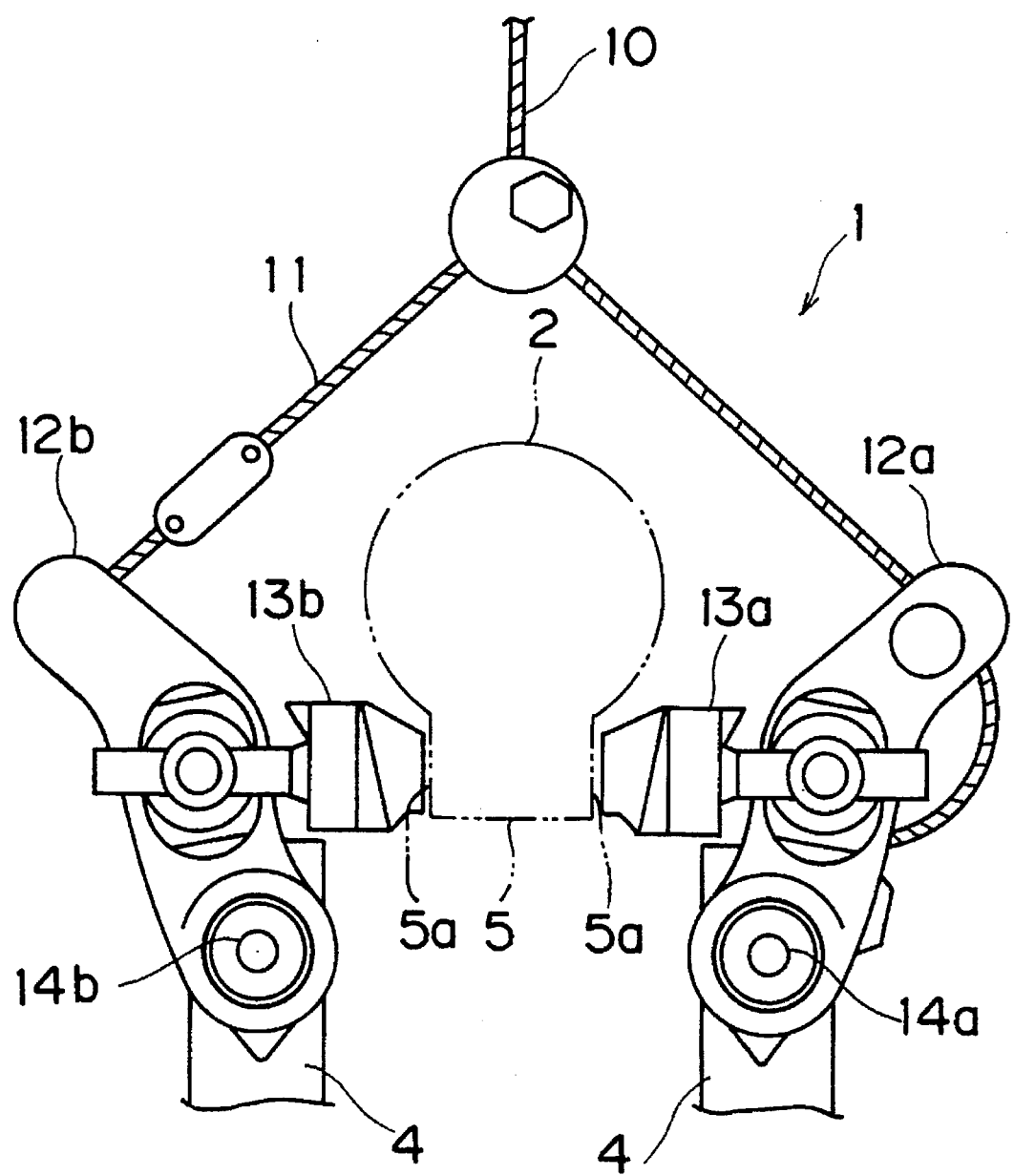
FIG. 2 is a front view of a brake device.
Figure 3:
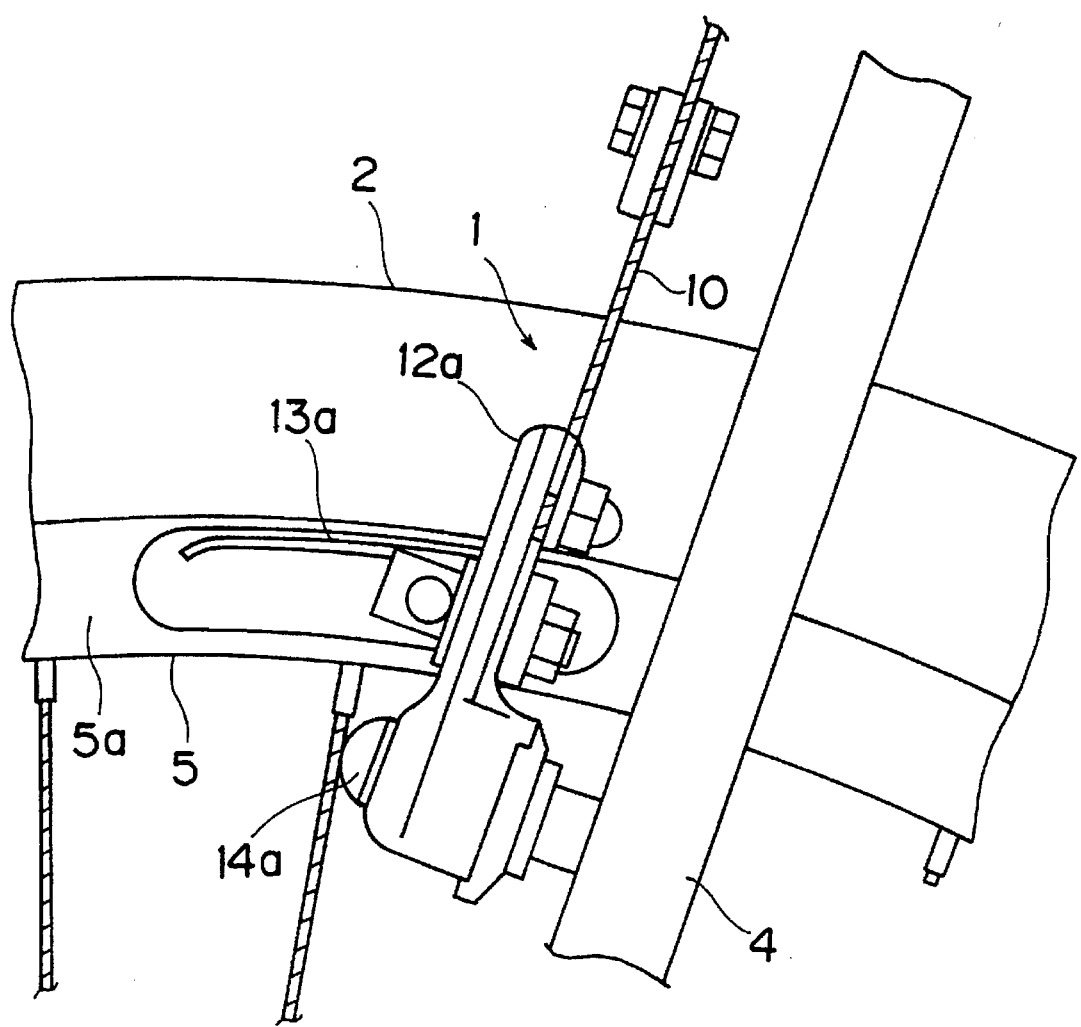
FIG. 3 is a side view of the brake device.
Figure 4:
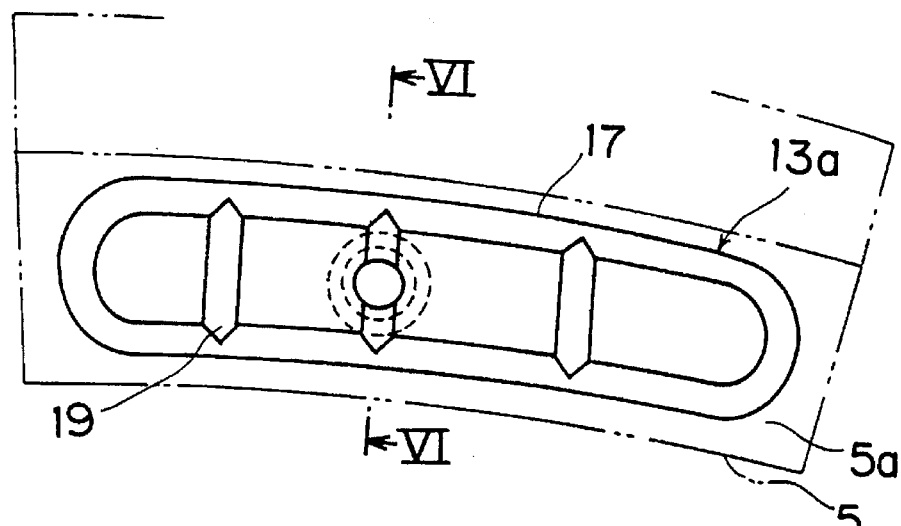
FIG. 4 is a side view of a brake shoe.
Figure 5:
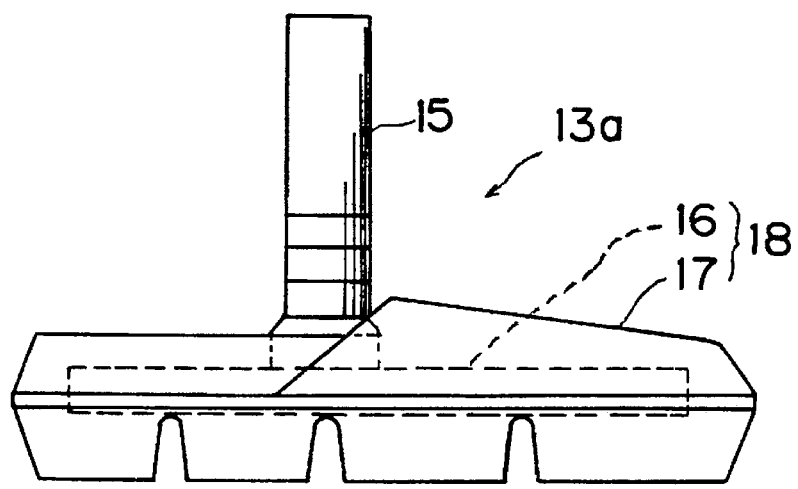
FIG. 5 is a plan of the brake shoe.
Figure 6:
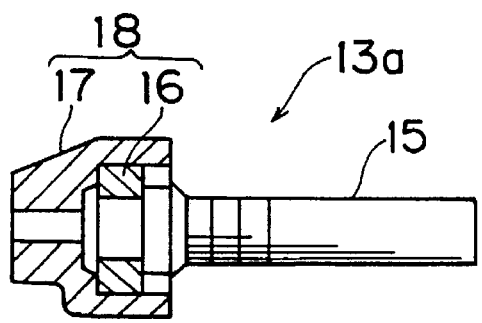
FIG. 6 is a VI—VI section of FIG. 4.

As shown in FIGS. 2 and 3, the brake device 1 is connected to an end part of a brake wire 10 extending from a brake lever 7 installed on a handle 6; and an end part of a wire 11 connected to a middle part of the brake wire 10. The brake device 1 has brake arms 12a and 12b of which the tip parts are connected to the wires 10 and 11 respectively; and brake shoes 13a and 13b which are adjustably and oppositely installed in the respective middles of the brake arms 12a and 12b. Respective base end parts of the brake arms 12a and 12b are freely pivotally supported by the front fork 4, and springs (not drawn) to orient the brake arms 12a and 12b in the respective opening directions are attached to pivots 14a and 14b. Thus, the brake arms 12a and 12b are usually oriented in the opening directions (to the brake release position), but they are made to pivot in the closing directions around the pivots 14a and 14b as the respective centers by pulling the brake wires 10 and 11 by operating the brake lever 7, so that the deceleration is effected.

The brake shoes 13a and 13b have structures which are oppositely arranged along both sides 5a of the rim 5 and have mirror-symmetrical relation to each other. The brake shoe 13a is hereinafter explained.

As shown in FIGS. 3 to 6, the brake shoe 13a includes an aluminum- or iron-made fixing pin 15 which can be connected to the brake arm 12a; and a shoe main body 18. The shoe main body 18 has: a holder plate 16 which is fixed on a tip of the fixing pin 15; and a friction pad 17, for example, made of synthetic rubber, in which the holder plate 16 is embedded and which comes into contact with the rim 5 and thereby acts upon it. The holder plate 16 is, for example, made of aluminum or iron. Water-cutting concaves 19 are formed at three positions on a rim contact face of the friction pad 17.

In the case where the fixing pin 15 is, for example, made of aluminum, the mass of the holder plate is, for example, 16.2 g, the mass of the friction pad 17 is, for example, 13.8 g, the mass of the fixing pin 15 is, for example, 2.9 g, their total mass being accordingly 32.9 g, and the mass of the shoe main body 18 is for example, 30 g. In addition, in the case where the fixing pin 15 is made of iron, the mass of the holder plate 16a is, for example, 27.4 g, the mass of the friction pad 17 is, for example, 10.4 g, the mass of the fixing pin 15 is, for example, 9.3 g, their total mass being accordingly 47.1 g, and the mass of the shoe main body is, for example, 37.8 g. The weights above given for the aluminum pin example were tested and the results are shown in row of table 2 as discussed below. The weights above given for the iron pin example are based upon experimentation, the experiments shown in table 1 row 4 as discussed below. The desirable relative weights were determined experimentally by adding an external weight. In the case of the aluminum example an actual brake shoe having the above relative weights was built and tested. Note no external weight was added but rather the holder plate was made heavier in the aluminum exammple. For the example with the iron pin the desired relative weight were also determined experimentally by adding external weights, in particular in table 1 row 4 the weight added was 17.4 grams. It is contemplated however that the holder plate in the iron pin example above is to be made heavier to include the experimetally added external weight.

In the brake device 1 having such features, if a rider operates the brake lever 7, the brake wires 10 and 11 are respectively pulled, the brake arms 12a and 12b pivot in the respective closing directions, the contact faces of the friction pads 17 and 17 are brought into contact with the sides 5a of the rim 5 to press them, whereby the deceleration is effected. In addition, if the brake lever 7 is released, the brake wires 10 and 11 are loosened, the springs impel the brake arms 12a and 12b to pivot in the respective opening directions, and tips of the friction pads 17 and 17 of the brake shoes 13a and 13b part from the sides 5a of the rim 5, whereby the brake is released.

In the brake device 1 having such features, if a rider operates the brake lever 7, the brake wires 10 and 11 are respectively pulled, the brake arms 12a and 12b pivot in the respective closing directions, the contact faces of the friction pads 17 and 17 are brought into contact with the sides 5a of the rim 5 to press them, whereby the deceleration is effected. In addition, if the brake lever 7 is released, the brake wires 10 and 11 are loosened, the springs impel the brake arms 12a and 12b to pivot in the respective opening directions, and tips of the friction pads 17 and 17 of the brake shoes 13a and 13b part from the sides 5a of the rim 5, whereby the brake is released.

Experiments

In order to determine desirable design characteristics where noises of such brake shoes, are minimized or dim various experiments were carried out under the following conditions.

Figure 7:
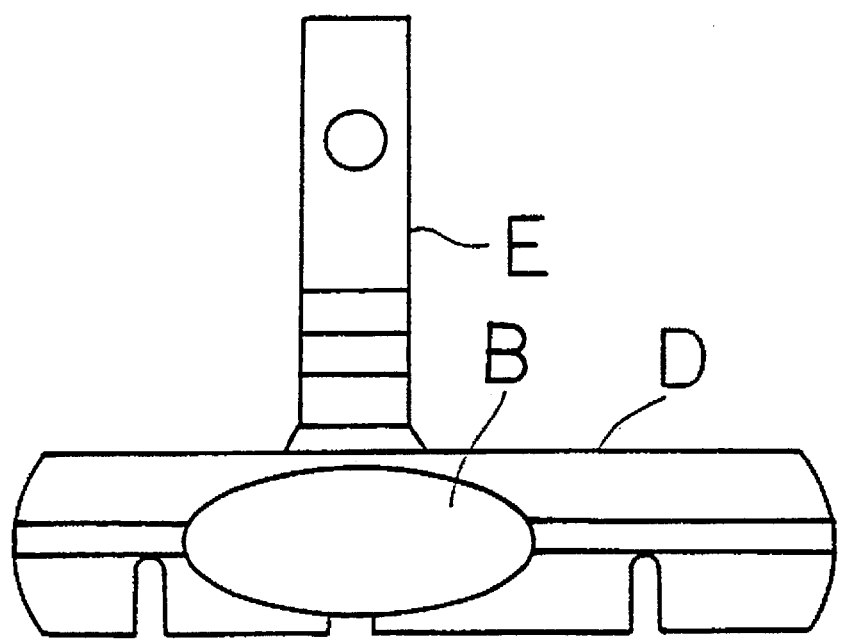
FIG. 7 is a plan of a brake shoe used in experiments.

First, product No. 1 designates a prior art brake shoe which includes an iron fixing pin E attached to a main shoe body D, where the mass of the holder plate is 10.0 grams, as shown in FIG. 7. The initial untested weight of the various parts of the brake shoe designated as product No. 1 are given in data row 1 of Table 1. For the experiments, various weights B were adhered to an upper exterior part of a shoe main body D of the product, in order to determine a weight ratio where noises is reduced. For the experiments a bicycle was allowed to run on a wet road, and the brake operation was then repeated 15 times on a slope of a dry road to examine the degree of noises. Results are collected in Table 1. All the weights given are in grams. In column 3, with the heading Holder Plate & Weight B (A) the weights given and designated as A, are a combination of the weight of the holder plate (10.0 g) plus the weight of the corresponding weight B.

TABLE 1

All Masses in Grams (g).

| Data No. | Product No. | Holder Plate & Weight (A) | Weight (B) | Friction Pad (C) | Main body & Weight (D = A + C) | Pin (E) | Total mass (F = D + E) | Mass ratio (G = D/E) | Relative size (A to C) | Noises | Remark |
| --- | --- | --- | --- | --- | --- | --- | --- | --- | --- | --- | --- |
| 1 | 1 | 10.0 | 0 | 10.4 | 20.4 | 9.3 | 29.7 | 2.2 | A < C | Maximum | Conventional Noises |
| 2 | 1 | 20.8 | 10.8 | 10.4 | 31.2 | 9.3 | 40.5 | 3.4 | A > C | Large | Conventional Noises |
| 3 | 1 | 24.0 | 14.0 | 10.4 | 34.4 | 9.3 | 43.7 | 3.7 | A > C | Middle | Conventional Noises |

TABLE 1-continued

All Masses in Grams (g).

| Data No. | Product No. | Holder Plate & Weight (A) | Weight (B) | Friction Pad (C) | Main body & Weight (D = A + C) | Pin (E) | Total mass (F = D + E) | Mass ratio (G = D/E) | Relative size (A to C) | Noises | Remark |
| --- | --- | --- | --- | --- | --- | --- | --- | --- | --- | --- | --- |
| 4 | 1 | 27.4 | 17.4 | 10.4 | 37.8 | 9.3 | 47.1 | 4.1 | A > C | Small | Desirable Results |
| 5 | 1 | 32.7 | 22.7 | 10.4 | 43.1 | 9.3 | 52.4 | 4.6 | A > C | None | Desirable Results |

As seen in Table 1, it was found that when the iron fixing pin was used, noises were reduced in the case where the mass ratio of the shoe main body to the fixing pin was "4.1", or greater and that as the mass ratio decreased noises increased. Accordingly, it was determined that in the case where the fixing pin was made of iron, it is desirable for the mass ratio to be preferably 4 or larger.

In the case where the fixing pin was made of iron, the mass ratio of 4or larger has one disadvantage in that total mass is no less than about 47.1 g. If weight reduction is a factor in brake design, as is the case in racing bicycles, such a large total mass may be undesirable. Thus, experiments were further carried out with brake shoes; where the fixing pin was made of aluminum. In these experiments, the mass of a brake shoe of product No. 2 having an aluminum-made fixing pin was changed by, as shown in FIG. 7, adhering weights 13 having various masses added to the brake shoe, thus examining the degree of noises. On this occasion, water was sprayed to the rim, and the brake operation was then repeated 10 times on a slope of a dry road to examine the degree of noises. Results are collected in Table 2. Table 2 further includes test results of a brake shoe designated product No. 3where is one embodiment of the present invention shown in FIG. 5. The weight of the various portions of the product No. 2 without the weights B are shown in the row Data No. 1 in Table 2 .

was larger than that of the friction pad C, noises were reduced. Furthermore, it was found that in the case where the above-mentioned masses were otherwise smaller or where the relative size of the masses was reversed, noises were large. From these findings, it was found that when the fixing pin was made of aluminum or when the material of the fixing pin was not limited, the mass ratio of the shoe main body to the fixing pin was preferably 10 or larger. In addition, it was found that when the fixing pin was made of aluminum with the intention of lightening its weight, the mass of the shoe main body was preferably 28 g or larger, and that in this case, the mass ratio was more preferably 10 or larger, and the mass of the holder plate was more preferably larger than that of the friction pad.

Alternate Configurations (a) The brake shoe may be furnished on a brake device for a rear wheel instead of a brake device for a front wheel.

(b) The brake shoe may be furnished to a caliper type or U-type brake device instead of a cantilever type brake device.

INDUSTRIAL APPLICATION

The present invention can provide a bicycle brake shoe with reduced noise characteristics; and is effective as a brake shoe for mountain bikes and conventional bicycles.

TABLE 2

All Masses in Grams (g)

| Data No. | Product No. | Holder Plate & Weight B (A) | Weight (B) | Friction pad (C) | Main Body & Weight (D = A + C) | Pin (E) | Total mass (F = D + E) | Mass ratio (G = D/E) | Relative size (A to C) | Noises High sound | Noises Low sound | Remark |
| --- | --- | --- | --- | --- | --- | --- | --- | --- | --- | --- | --- | --- |
| 1 | 2 | 9.6 | 0 | 12.2 | 21.8 | 2.8 | 24.6 | 7.8 | A < C | Middle | Maximum | Conventional Noises |
| 2 | 2 | 10.2 | 0.6 | 12.2 | 22.4 | 2.8 | 25.2 | 8.0 | A < C | Middle | Maximum | Conventional Noises |
| 3 | 2 | 13.0 | 3.4 | 12.2 | 25.2 | 2.8 | 28.0 | 9.0 | A > C | Middle | Large | Conventional Noises |
| 4 | 2 | 15.8 | 6.2 | 12.2 | 28.0 | 2.8 | 30.8 | 10.0 | A > C | Small | Small | Desirable Results |
| 5 | 2 | 18.6 | 9.0 | 12.2 | 30.8 | 2.8 | 33.6 | 11.0 | A > C | Small | None | Desirable Results |
| 6 | 3 | 16.2 | 0 | 13.8 | 30.0 | 2.9 | 32.9 | 10.3 | A > C | Small | Small | Desirable Results |

As a result, it was found that if the mass of the shoe main body D having a fixing pin E made of aluminum; was larger than 28 grams noise, were reduced. It was further observed that if the mass ratio of the shoe main body B to the fixing pin was larger than 10.0, noises were also reduced. In addition, it was also found that if the mass of the holder plate

We claim:

1. A bicycle brake shoe attachable to a brake arm of a brake device which acts upon a bicycle wheel rim, the bicycle brake shoe comprising:

an aluminum fixing pin connectable to the brake arm; and a shoe main body having: a holder plate fixed on a tip of said fixing pin; and an elastomer friction pad in which the holder plate is embedded, said shoe main body being contactable with the wheel rim, said shoe main body configured to reduce noise during engagement with the wheel rim such that a mass ratio is defined by the mass of said shoe main body divided by the mass of said fixing pin, and said mass ratio is at least 10.

2. A bicycle brake shoe as in claim 1, wherein said holder plate has a mass greater than the mass of said friction pad.

3. A bicycle brake shoe as in claim 1, wherein said shoe main body has a mass of at least 28.0 g.

4. A bicycle brake shoe, comprising:

a fixing pin which can be connected to a brake arm; and a shoe main body having: a holder plate fixed on a tip of the fixing pin; an elastomer friction pad in which the holder plate is embedded and which comes into contact with the wheel rim and thereby acts upon the wheel rim; and a mass at least 10 times that of the fixing pin.

5. A bicycle brake shoe, comprising:

an iron fixing pin which can be connected to the brake arm; and a shoe main body having a holder plate fixed on a tip of the fixing pin, an elastomer friction pad in which said holder plate is embedded and a mass at least 4 times the mass of said fixing pin.

6. A bicycle brake shoe comprising:

an aluminum fixing pin configured for connection to a brake arm;

a holder plate fixed to the tip of said fixing pin; and a shoe main body formed about said holder plate such that said holder plate is generally imbedded within said shoe main body, said shoe main body being formed from an elastomer, said shoe main body defining a friction pad configured to contact a wheel rim and said shoe main body having a mass at least 10 times that of said fixing pin for reducing noise in response to said friction pad contacting the wheel rim.

7. The bicycle brake shoe as set forth in claim 6 wherein said holder plate is made of iron.

8. A bicycle brake shoe, comprising:

an iron fixing pin; and a shoe main body having a holder plate fixed to one end of the fixing pin, said shoe main body having an elastomer friction pad formed about said holder plate such that said holder plate is embedded within said friction pad, said friction pad configured to contact a wheel rim, said shoe main body having a mass at least 4 times that of said fixing pin for reducing noise in response to said friction pad contacting the wheel rim.

9. The bicycle brake shoe as set forth in claim 8 wherein said holder plate is made of iron.

\* \* \* \* \*